United States Patent Office 3,119,279
Patented Jan. 28, 1964

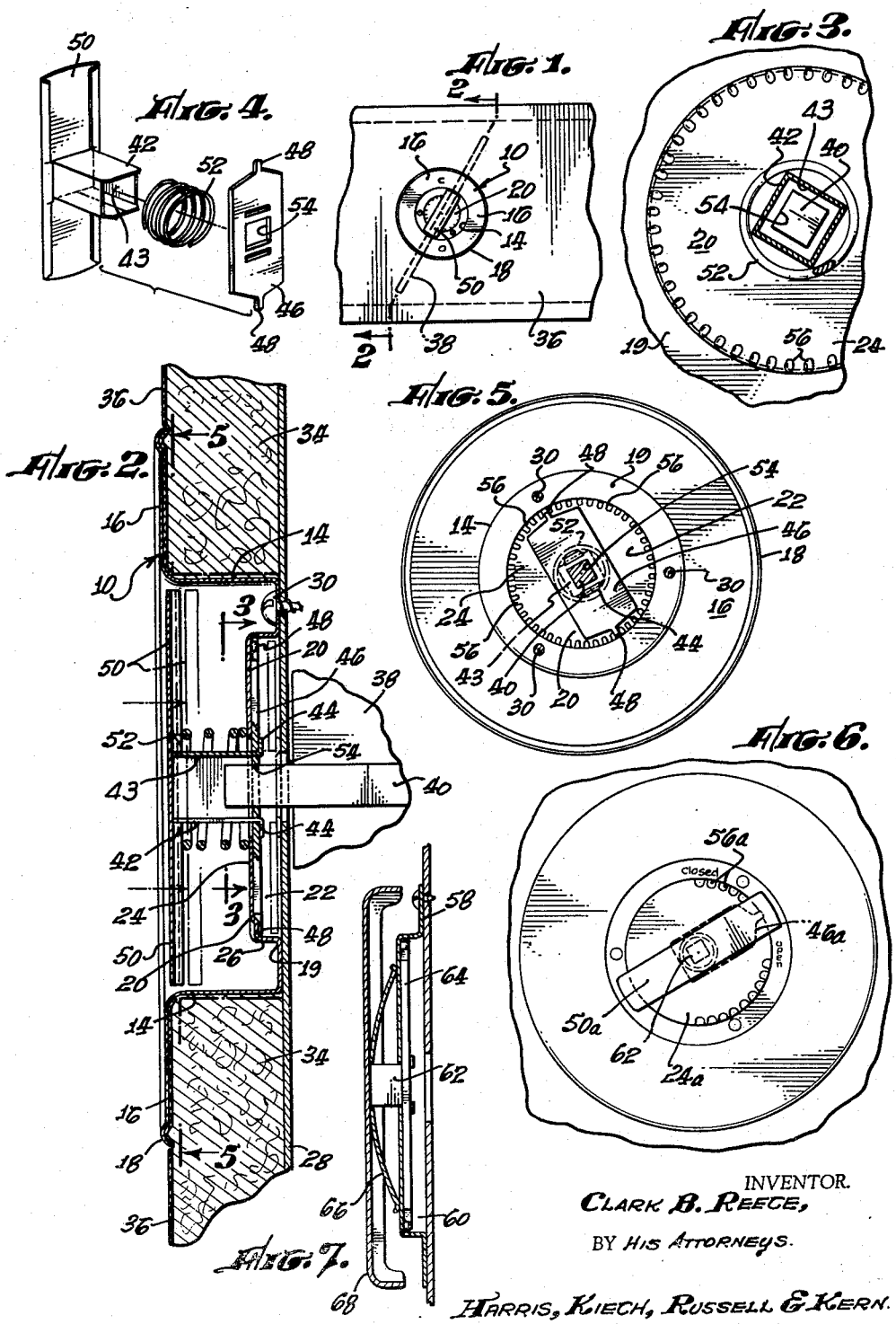

3,119,279
DAMPER POSITIONING MEANS
Clark B. Reece, Altadena, Calif., assignor to R.I.N.C.O., Los Angeles, Calif., a limited partnership
Filed Jan. 30, 1961, Ser. No. 85,777
10 Claims. (Cl. 74—528)

This invention relates to an improved damper regulator for controlling the flow of a fluid stream in a sheet metal duct or the like. The improved damper regulator of the invention provides for ready adjustment and easy locking of the damper regulator in any desired position. The damper regulator of the invention constitutes an improved design over that described and illustrated in my copending patent application Serial No. 743,122, filed January 19, 1958 now Patent No. 2,966,169 issued December 27, 1960.

Conventional damper regulators include a control shaft sometimes described as a damper rod, which extends through the wall of the duct with the inner portion of the shaft within the duct carrying a butterfly valve or other suitable damper means. Provision is had for adjustably locking the outer end of the control shaft to the duct. Typical prior devices consist of fabricated metal elements including a crank arm fixed to the control shaft exteriorly of the duct and means for fastening the crank arm to a plate or other extension of the device on the outer surface of the duct. The prior art devices for the most part have an ungainly appearance and are frequently awkward to operate during repositioning of the damper. The damper regulator illustrated in Patent No. 2,966,169 when installed presents a neat workmanlike appearance and provides a positive locking device. The damper regulator of the invention provides an improved manner of locking the damper in place and still maintains a neat appearance. The design of the improved damper regulator also facilitates repositioning of the damper with less effort than formerly required.

The damper regulator of the invention is designed especially for use with a gas-carrying duct having a damper means pivotally carried by a damper rod. The damper regulator comprises a body member having a rearwardly opening recess at its rear side. With the damper regulator positioned against the duct, the recess is immediately adjacent thereto. A lockfast element which is positioned within the recess is normally held in engagement against the bottom of the recess. A hollow shaft is fastened to the lockfast element and extends forwardly through a hole in the recess bottom. This shaft is designed to receive the damper rod and is capable of rotational movement within the hole of the recess bottom. A spring means is provided to urge the shaft forwardly and the lockfast element into engagement with the bottom of the recess. Upon compression of the spring means there occurs an unlocking of the damper regulator which is achieved by rearward movement of the lockfast element away from the bottom of the recess. The disengagement of the locking member from the recess bottom permits rotation of the shaft and damper rod to reposition the damper means to any desired angular position. Preferably the outer end of the shaft is provided with a transverse handle member to facilitate actuation of the shaft in overcoming the spring tension.

The spring means may take either the form of a coil spring or a flat metal spring. In the case of the coil spring, the coil encircles the shaft at the front side of the damper regulator, being positioned between the body of the damper regulator and the transverse handle member.

In one embodiment of the damper regulator of the invention which is designed especially for use with insulated sheet metal ducts or the like, the damper regulator is provided with a body member having a short tubular portion (closed at its rear end), usually cylindrical in shape with an outwardly extending collar encircling the tubular portion at its front end. The body member is also provided with a rearwardly opening recess at its rear side. This recess, as mentioned before, is immediately adjacent the duct when the damper regulator is placed in its operative position and serves to house a lockfast element. A hollow shaft fastened to the lockfast element extends forwardly through a hole in the bottom of the recess into the aforementioned tubular portion. The shaft is adapted to receive the damper rod and is capable of limited longitudinal movement lengthwise of the damper rod. A handle member disposed within the tubular portion is fastened to the forward end of the shaft and a spring member disposed between the handle and the body member urges the shaft forwardly and the locking member into engagement with the bottom of the recess. Preferably the bottom of the recess is provided with raised projections adapted to frictionally engage the lockfast element to prevent rotational movement when the locking member is held under spring tension against the recess bottom.

Other advantages and objects of the invention will become more apparent to those skilled in the art from the following description of a preferred form of the invention, it being understood that other modifications and changes may be made.

In the drawings:

FIG. 1 is a front elevational view of a preferred embodiment of the damper regulator of the invention installed in an insulated, gas-carrying sheet metal duct;

FIG. 2 is a cross-sectional view taken along line 2—2 of FIG. 1 illustrating details of the improved damper regulator and its manner of coupling with a damper rod;

FIG. 3 is a fragmentary cross-sectional view partly in elevation, taken along line 3—3 of FIG. 2;

FIG. 4 is an exploded view of several components of the improved damper regulator of FIGS. 1 and 2;

FIG. 5 is a rear elevational view of the damper regulator of the invention taken along line 5—5 of FIG. 2;

FIG. 6 is a front elevational view of another form of the damper regulator of the invention generally resembling that of FIGS. 1 and 2; and FIG. 7 shows a third embodiment of the damper regulator of the invention of a type adapted for use with noninsulated gas ducts.

With reference to FIGS. 1 and 2, there is illustrated a damper regulator device 10 designed especially for use with heavily insulated air or other gas conduits. The damper regulator device 10 has a body formed of a substantially cylindrical portion 14 which at its forward end supports an outwardly-extending integrally formed circular collar 16. The circular collar 16 has a peripheral crimped edge 18. The rear end of the cylindrical portion is closed by an end wall 19. The end wall 19 of the cylindrical portion 14 as seen from the front is formed with a round raised portion 20 which has a substantially lesser diameter than the cylindrical portion itself. The round raised portion 20 provides at the rear side of the damper regulator device 10 a rearwardly opening circular recess 22. The circular recess 22 is defined by a bottom wall 24 and a shallow cylindrical wall 26 which extends perpendicularly from the outer circular periphery of the bottom wall 24. The bottom wall 24 is formed from a central portion of the end wall 19 and has essentially the diameter of the round raised portion 20.

As best seen in FIGS. 2 and 5, the damper regulator device 10 is held to a vertical duct wall 28 by three screws 30 which extend through the end wall 19. A layer of insulation 34 is held between the duct wall 28 and the circular collar 16 with an outer weatherproofing cover or skin 36 being glued to the underside of the circular collar 16. The air duct carries a damper or butterfly valve 38 pivotally mounted on a damper rod 40.

The damper rod 40, which has a rectangular cross section, usually square, terminates within a hollow shaft member 42. The shaft member 42 at its rearward end is fastened by a pair of turned over ears 44 to a transverse locking member 46 or lockfast element. The transverse locking member 46 in the embodiment illustrated takes the form of a flat, elongated, metal piece which at each of its opposite ends is provided with an outwardly extending finger 48. The transverse locking member is housed within the circular recess 22 at the back side of the damper regulator device. The aforementioned shaft member 42 which at its rearward end is fastened to the transverse locking member 46 extends through a hole in the bottom wall 24 of the recess 22 into the space defined by the cylindrical portion 14. The forward end of the shaft member 42 is attached to a handle member 50 which, as best seen in FIG. 1, is rectangular in side elevation. A coil spring 52 encircles the portion of the shaft member within the cylindrical portion 14 and is held at its opposite ends respectively between the underside of the handle member 50 and the round raised portion 20 which has a common wall with the recess 22 at the back side of the damper regulator device 10.

The coil spring 52 urges the shaft member 42 in a forward direction, bringing the transverse locking member 46 into flat engagement with bottom wall 24 of the recess 22.

As best seen in FIG. 5, the transverse locking member 46 is provided with a centrally located hole 54 only slightly larger than the cross section of the damper rod 40, with the rectangular hole 43 of the shaft member 42 being somewhat larger than the centrally located hole 54 and rod 40. With this relationship the damper rod 40 is housed within the shaft member 42 away from its inner wall. The hollow shaft member 42 is capable of limited longitudinal movement lengthwise of the damper rod 40. In an alternative structure, the hollow shaft member 42 itself is sized to slidably grasp the damper rod 40. In the embodiment illustrated, the transverse locking member 46 slidably grasps the rod 40.

The coil spring 52 upon being compressed effects an unlocking of the damper regulator device 10 through rearward movement of the transverse locking member 46 away from the recess bottom wall 24, thereby permitting rotation of the shaft member 42 and the damper rod 40 to reposition the damper means. The transverse locking member 46 and handle member 50 are shown in their unlocked positions in phantom lines in FIG. 2. Removal of the compression force from the coil spring 52 results in the transverse locking member 46 once again engaging the bottom wall 24 with the locking fingers 48 of the locking member 46 seating between adjacent raised projections 56 which encircle the perimeter of the bottom wall 24. From the front, the raised projections 56 are seen as indentations. The projections 56 are readily formed during the stamping of the damper regulating device.

The device of FIG. 6 differs from that of FIGS. 1 to 5 inclusive in that the raised projections 56a extend only half way around the perimeter of the bottom wall 24a of the circular recess at the back side of the device. It will also be noted that the transverse locking member 46a is approximately half the size of the corresponding locking member of the earlier embodiment. There is no need to have a full transverse locking member in the embodiment of FIG. 6 since the raised projections cover only 180° of the bottom wall perimeter. The handle member 50a of FIG. 6 is illustrated as being of the same length as the corresponding member of the embodiment of FIGS. 1 and 2; however, if desired the handle member likewise could be abbreviated to half size as has the locking member 46a.

The device of FIG. 7 differs in several respects from the earlier described two embodiments. It will be noted that unlike the embodiments of FIG. 6 and FIGS. 1–5, the device has no circular collar or cylindrical portion. The present device is intended for use with noninsulated air conduits and for this reason needs no collar to receive the weatherproofing cover. The device of FIG. 7 comprises a body member 58 which in its preferred form has a general circular appearance and which at its back side is provided with a rearwardly opening recess 60. A rectangular cross sectioned shaft member 62 attaches at its rear end to a transverse locking member 64 which is held as before in flat engagement against the bottom wall of the recess 60 by a spring member 66. The spring member 66 here takes the form of a flat elongated metal strip which at its opposite ends engages the forward face of the device. The central portion of the spring member 66 as seen in FIG. 7 engages the inner face of a handle member 68, forcing the handle member 68 forwardly. The damper regulator of FIG. 7 is unlocked as in the other embodiments by compression of the spring 66 and movement of the transverse locking member 64 away from the bottom wall of the recess.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A damper regulator for use with a fluid carrying duct having a damper means pivotally carried by a damper rod, said damper regulator comprising:
    a body member having a forward face and a rearwardly opening recess at its rear side, said damper regulator in its installed position having said recess adjacent the duct with the forward end of the recess closed by a wall;
    a lockfast element positioned within the recess;
    a hollow shaft connected to said lockfast element and extending forwardly through a hole in the recess wall to the front side of the body member, said hollow shaft with the damper regulator in its installed position being held to the damper rod with the rod disposed within the shaft and with said shaft being movable axially thereof;
    a manually operable member disposed at the forward end of the shaft at the front side of the damper regulator; and
    a spring member disposed between the manually operable member and the forward face of the body member urging the shaft forwardly and the lockfast element into locking engagement with the recess wall, said spring member upon being compressed effecting an unlocking of the damper regulator through rearward movement of the lockfast element away from the recess wall, thereby permitting rotation of the shaft and damper rod to reposition the damper means.

2. A damper regulator in accordance with claim 1 wherein the spring member is a coil spring which encircles said shaft at the front side of the damper regulator.

3. A damper regulator in accordance with claim 1 wherein the spring member is a flat metal spring disposed between the manually operable member and the body member of the damper regulator.

4. A damper regulator in accordance with claim 1 wherein the wall of the recess is provided with raised projections adapted to frictionally engage the lockfast element when said lockfast element is held in engagement against said wall of the recess to forestall rotational movement of said lockfast element and damper rod.

5. A damper regulator in accordance with claim 1 wherein the lockfast element has a hole in alignment with the hollow shaft, said hole being defined by an encircling wall which wall is in sliding engagement with the damper rod.

6. A damper regulator for use with a fluid carrying duct having a damper means pivotally carried by a damper rod, said damper regulator comprising:

- a body member having a forward face and a forwardly opening short tubular portion closed at its rear end, an outwardly extending collar encircling the tubular portion at the forward end of the tubular portion, said body member being further provided with a rearwardly opening recess at its rear side, said damper regulator in its installed position having said recess adjacent the duct with the forward end of the recess closed by a wall;
- a lockfast element positioned within the recess;
- a hollow shaft fastened to said lockfast element and extending forwardly through a hole in the recess wall into the tubular portion, said hollow shaft with the damper regulator in its installed position being held to the damper rod with the rod disposed within the shaft and with said shaft being movable axially thereof;
- a manually operable member disposed at the forward end of the shaft within the tubular portion; and
- a spring member disposed between the manually operable member and the forward face of the body member urging the shaft forwardly and the lockfast element into locking engagement with the recess wall, said spring member upon being compressed effecting an unlocking of the damper regulator through rearward movement of the lockfast element away from the recess wall, thereby permitting rotation of the shaft and damper rod to reposition the damper means.

7. A damper regulator in accordance with claim 6 wherein the spring member is a coil spring which encircles said shaft at the front side of the damper regulator.

8. A damper regulator in accordance with claim 6 wherein the spring member is a flat metal spring disposed between the manually operable member and the body member of the damper regulator.

9. A damper regulator in accordance with claim 6 wherein the wall of the recess is provided with raised projections adapted to frictionally engage the lockfast element when said lockfast element is held in engagement against said wall of the recess to forestall rotational movement of said lockfast element and damper rod.

10. A damper regulator in accordance with claim 6 wherein the tubular portion has a circular cross section.

References Cited in the file of this patent

UNITED STATES PATENTS

| | | |
|---|---|---|
| 1,407,802 | Olinger | Feb. 28, 1922 |
| 1,624,114 | Norviel | Apr. 12, 1927 |
| 2,348,860 | Siedle | May 16, 1944 |
| 2,438,045 | Gerhardt et al. | Mar. 16, 1948 |
| 2,561,482 | Schostak | July 24, 1951 |
| 2,704,466 | Way | Mar. 22, 1955 |
| 2,720,393 | Valentine | Oct. 11, 1955 |
| 2,729,114 | Young | Jan. 3, 1956 |
| 2,841,034 | Greene | July 1, 1958 |
| 2,858,760 | Lathrop | Nov. 4, 1958 |
| 2,966,169 | Reece | Dec. 27, 1960 |
| 3,016,762 | Floyd | Jan. 16, 1962 |